United States Patent
Ebrahimi Afrouzi

(10) Patent No.: US 10,845,817 B1
(45) Date of Patent: Nov. 24, 2020

(54) SYSTEM AND METHOD FOR CONFINING ROBOTIC DEVICES

(71) Applicant: Ali Ebrahimi Afrouzi, San Jose, CA (US)

(72) Inventor: Ali Ebrahimi Afrouzi, San Jose, CA (US)

( * ) Notice: Subject to any disclaimer, the term of this patent is extended or adjusted under 35 U.S.C. 154(b) by 349 days.

(21) Appl. No.: 15/674,310

(22) Filed: Aug. 10, 2017

Related U.S. Application Data

(60) Provisional application No. 62/373,512, filed on Aug. 11, 2016.

(51) Int. Cl.
*G05D 1/00* (2006.01)
*G05D 1/02* (2020.01)
*B25J 9/16* (2006.01)

(52) U.S. Cl.
CPC .......... *G05D 1/0248* (2013.01); *B25J 9/1684* (2013.01); *G05D 1/024* (2013.01); *G05D 1/0236* (2013.01); *G05D 2201/0203* (2013.01); *G05D 2201/0207* (2013.01)

(58) Field of Classification Search
CPC ....... Y10S 901/01; Y10S 901/09; B25J 5/007; B25J 9/1674; G01S 5/12; G01S 5/16; A01D 34/008; A01D 2101/00; G05D 2201/0208; G05D 2201/0215; G05D 1/0265; G05D 1/0234; G05D 1/0236
USPC .......... 700/245; 318/568.12, 567; 901/1, 46, 901/47; 701/23
See application file for complete search history.

(56) References Cited

U.S. PATENT DOCUMENTS

| | | | |
|---|---|---|---|
| 5,284,522 A | 8/1994 | Kobayashi et al. | |
| 6,255,793 B1 | 7/2001 | Peless et al. | |
| 6,300,737 B1 | 10/2001 | Bergvall et al. | |
| 8,380,350 B2* | 2/2013 | Ozick | G05D 1/0242 700/253 |
| 8,428,776 B2* | 4/2013 | Letsky | A01D 34/008 700/245 |
| 9,516,806 B2* | 12/2016 | Yamauchi | G05D 1/0236 |
| 9,939,529 B2* | 4/2018 | Haegermarck | G01S 17/023 |

(Continued)

*Primary Examiner* — Dalena Tran

(57) ABSTRACT

A method for confining and/or modifying the movement of robotic devices by means of a boundary component. The boundary component is placed within an area co-located with the robotic device. The boundary component has a predetermined surface indentation pattern that may be discerned by a sensor component installed onto the robotic device. A robotic device configured with a line laser emitting diode, an image sensor, and an image processor detects predetermined indentation patterns of surfaces within a specific environment. The line laser diode emits the line laser upon surfaces within the filed of view of the image sensor. The image sensor captures images of the projected line laser and sends them to the image processor. The image processor iteratively compares received images against a predetermined surface indentation pattern of the boundary component. Once the predetermined indentation pattern is detected the robotic device may mark the location within the working map of the environment. This marked location, and hence boundary component, may be used in confining and/or modifying the movements of the robotic device within or adjacent to the area of the identified location. This may include using the marked location to avoid or stay within certain areas or execute pre-programmed actions in certain areas.

20 Claims, 4 Drawing Sheets

(56) References Cited

U.S. PATENT DOCUMENTS

2005/0280802 A1* 12/2005 Liu .................... G01C 15/004
                                                        356/5.01
2006/0020370 A1    1/2006 Abramson
2012/0265391 A1   10/2012 Letsky
2015/0328775 A1* 11/2015 Shamlian ............... B25J 9/1676
                                                        700/258

* cited by examiner

SYSTEM AND METHOD FOR CONFINING ROBOTIC DEVICES

CROSS-REFERENCE TO RELATED APPLICATIONS

This application claims the benefit of provisional patent application Ser. No. 62/373,512, filed Aug. 11, 2016 by the present inventor.

FIELD OF THE INVENTION

The present invention relates to robotic systems, and more particularly, to methods for confining or limiting the movement of robotic devices.

BACKGROUND OF INVENTION

The follow is a tabulation of some prior art that presently appears relevant:

U.S. Pat. Documents

| Pat. No. | Kind Code | Issue Date | Patentee |
|---|---|---|---|
| 6,255,793 | B1 | Jul. 3, 2001 | Friendly Robotics Ltd |
| 2012/0265391 | A1 | Oct. 18, 2012 | RoboLabs Inc |
| 5,284,522 | A | Aug. 2, 1994 | Panasonic Corp |
| 2006/0020370 | A1 | Jan. 26, 2006 | Shai Abramson |
| 8,380,350 | B2 | Feb. 19, 2013 | iRobot Corp |
| 6,300,737 | B1 | Oct. 9, 2001 | Electrolux AB |

International Patent Documents

| Country Code | Pat. No. | Kind Code | Issue Date | Patentee |
|---|---|---|---|---|
| EP | 1,331,537 | A1 | Aug. 3, 2005 | iRobot Corp |
| ES | 2,402,920 | T3 | May 10, 2013 | Samsung Electronics Co Ltd |

Several systems for confining robotic devices to specific physical space for the purpose of performing work have been proposed in prior art. Such work may include floor cleaning, lawn care, and transportation. One approach toward confining robotic devices may be the use of large physical barriers to block the robotic device from entering, or becoming proximate with, one or more objects and/or areas of operation. However, this solution is neither efficient nor practical as physical barriers may encumber routine movement throughout the area of operation and an undesirable degree of human intervention is required. In prior art, sophisticated navigation systems have been used whereby the robot is trained or programmed to travel along predetermined paths or its position is monitored within a stored map. In such navigation systems large amounts of memory are required to store information related to each location. This is undesirable, particularly in cases where the robotic device is to be used in various locations as a large amount of memory would be required. The robotic device may also need to be trained or re-programmed for each new location or each time the work area is changed which is unpractical for consumer use. Other approaches in prior art include the installation of cables or wires to define the boundary of an area. These may be aesthetically unpleasing and can be a tripping hazard. Furthermore, installation may be difficult as cables or wires are ideally to be placed underground or beneath carpet. These methods mentioned in addition to other prior art proposed may not be ideal as they often require the use of additional equipment and substantial setup. The present invention addresses these issues by introducing a method for confining and/or modifying the movement of a robotic device by means of a recognizable boundary component which may already pre-exist within the working area. Once recognized, the boundary component can be used to erect virtual boundaries.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

It is a goal of the present invention to introduce a system and method for confining and/or modifying the movement of robotic devices.

The present invention achieves the above stated goal wherein the movement of a robotic device is confined or limited by means of a boundary component. The boundary component is placed within an area co-located with the robotic device. The boundary component may have a predefined pattern in form of a predetermined surface indentation pattern that may be discerned by a sensor component installed onto the robotic device.

A robotic device configured with a line laser emitting diode, an image sensor, and an image processor detects predetermined indentation patterns of surfaces within a specific environment. The line laser diode emits the line laser upon surfaces within the field of view of the image sensor. The image sensor captures images of the projected line laser and sends them to the image processor. The image processor iteratively compares received images against the predetermined surface indentation pattern of the boundary component. Once the predefined pattern in the form of the predetermined indentation pattern is detected the robotic device may mark the location within the working map of the environment. This marked location, and hence boundary component, may be used in confining and/or modifying the movements of the robotic device within or adjacent to the area of the identified location. This may include using the marked location to avoid or stay within certain areas or execute pre-programmed actions in certain areas.

BRIEF DESCRIPTION OF THE DRAWINGS

Non-limiting and non-exhaustive features of the present invention are described and depicted with reference to the following figures, wherein like reference numerals refer to like parts throughout the various figures.

DETAILED DESCRIPTION OF THE INVENTION

Figure 1A:
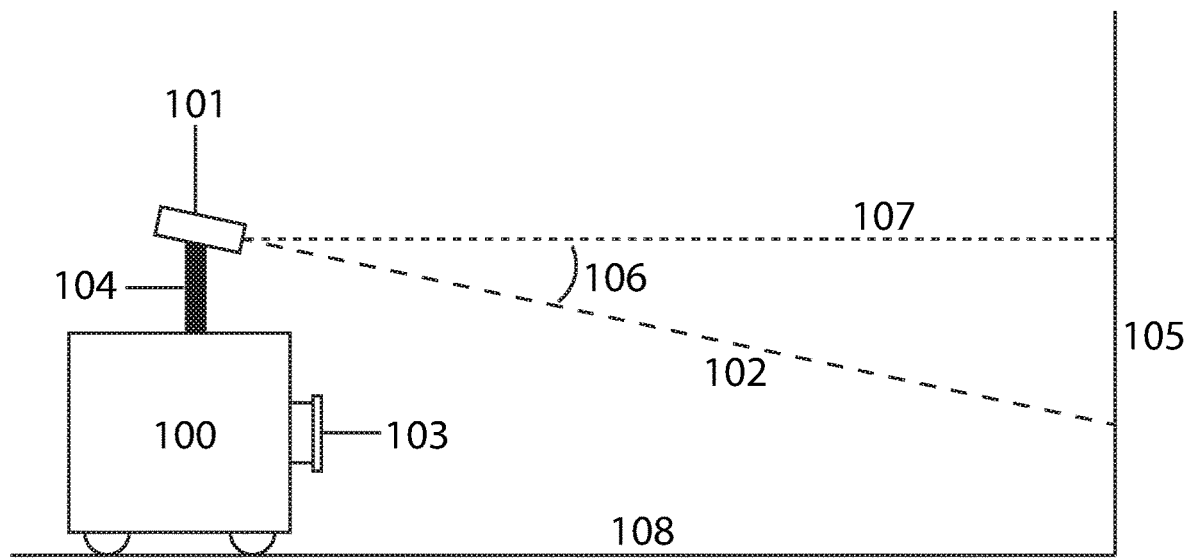
FIG. 1A illustrates a side view of a robotic device with an image sensor and line laser diode embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. The disclosure described herein is directed generally to providing virtual boundaries and location indicators for limiting surface coverage and navigating robotic devices.

As understood herein, the term "image sensor" may be defined generally to include one or more sensors that detect and convey the information that constitutes an image by converting the variable attenuation of light waves into signals. The term "image processor" may be defined generally to include an image processing engine or media processor that uses signal processing to extract characteristics or parameters related to an input image.

As understood herein, the term "robot" or "robotic device" may be defined generally to include one or more autonomous or semi-autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor and/or controller that processes and/or controls motors and other robotic autonomous or cleaning operations, network or wireless communications, power management, etc., and one or more clock or synchronizing devices.

Generally, the present invention relates to robotic systems, and more particularly, to methods for confining and/or modifying the movement of robotic devices.

The present invention proposes a method for confining or limiting the movement of robotic devices by means of a boundary component. The boundary component is placed within an area co-located with the robotic device. The boundary component may have a predefined pattern in the form of a predetermined surface indentation pattern that may be recognized by the robotic device and used to identify boundaries. A robotic device configured with a line laser emitting diode, an image sensor, and an image processor detects predetermined indentation patterns of surfaces within a specific environment. The image sensor and image processor detect the predetermined indentation pattern by continuously analyzing the projections of the line laser diode disposed on the robotic device. The line laser diode emits the line laser upon surfaces within the field of view of the image sensor. The image sensor captures images of the projected line laser and sends them to the image processor. The image processor iteratively compares received images against the predetermined surface indentation pattern of the boundary component. Once the predefined pattern in the form of the predetermined indentation pattern is detected the robotic device may mark the location within the working map of the environment. This marked location, and hence boundary component, may be used in confining and/or modifying the movements of the robotic device within or adjacent to the area of the identified location. This may include using the marked location as a boundary to avoid or stay within certain areas or execute pre-programmed actions in certain areas. For example, areas adjacent to the boundary component may be marked as off-limit areas by the robotic device thereby confining and/or modifying its movement within the working area. The boundary component may be placed at any desired location to erect a virtual boundary to limit or confine the movement of the robotic device.

Referring to FIG. 1A, a side view of a robotic device with an image sensor and line laser diode is illustrated. The robotic device 100 includes image sensor 103 and line laser diode 101 which is mounted on the robotic device 100 by connecting member 104. Dashed line 102 represents the emissions from line laser diode 101. The line laser diode is positioned to emit the line laser at a slight downward angle 106 with respect to the work surface plane 108. Line 107 is shown for reference and is parallel to work surface 108. The line laser emissions emitted by line laser diode 101 are projected onto surfaces in front of the device, surface 105 in this particular case.

Figure 1B:
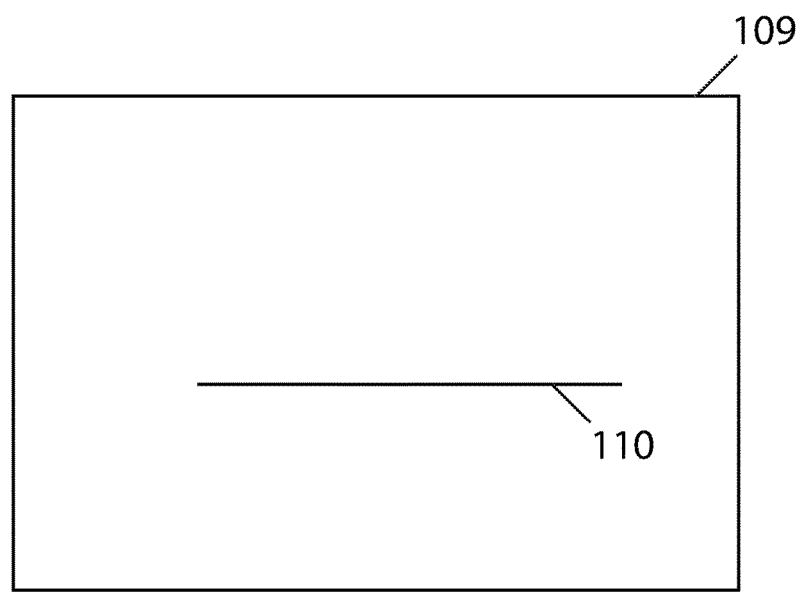
FIG. 1B illustrates a front view of an image captured of the line laser projected onto the flat surface in FIG. 1A embodying features of the present invention.

Referring to FIG. 1B, a front view of the corresponding image captured by image sensor 103 of the line laser projected onto surface 105 is illustrated. The frame 109 represents the field of view of the image sensor 103. Line 110 represents the line laser projected by line laser diode 101 in FIG. 1A onto surface 105. Since surface 105 is flat, the projected line in the captured image is not skewed in any direction. A line laser projected onto uneven surfaces or surfaces with indentations will produce skewed or disjointed projections. Projected lines will appear larger as the distance to the surface on which the line laser is projected increases and will appear smaller as this distance decreases. Additionally, projected lines will appear lower as distance to the surface on which the line laser is projected increases as the line laser diode is angled downward with respect to the work surface plane. It should be noted that the line laser diode may alternatively be angled upward relative to the plane of the work surface, and projected lines in such cases will appear higher as distance to the surface increases.

Figure 2:
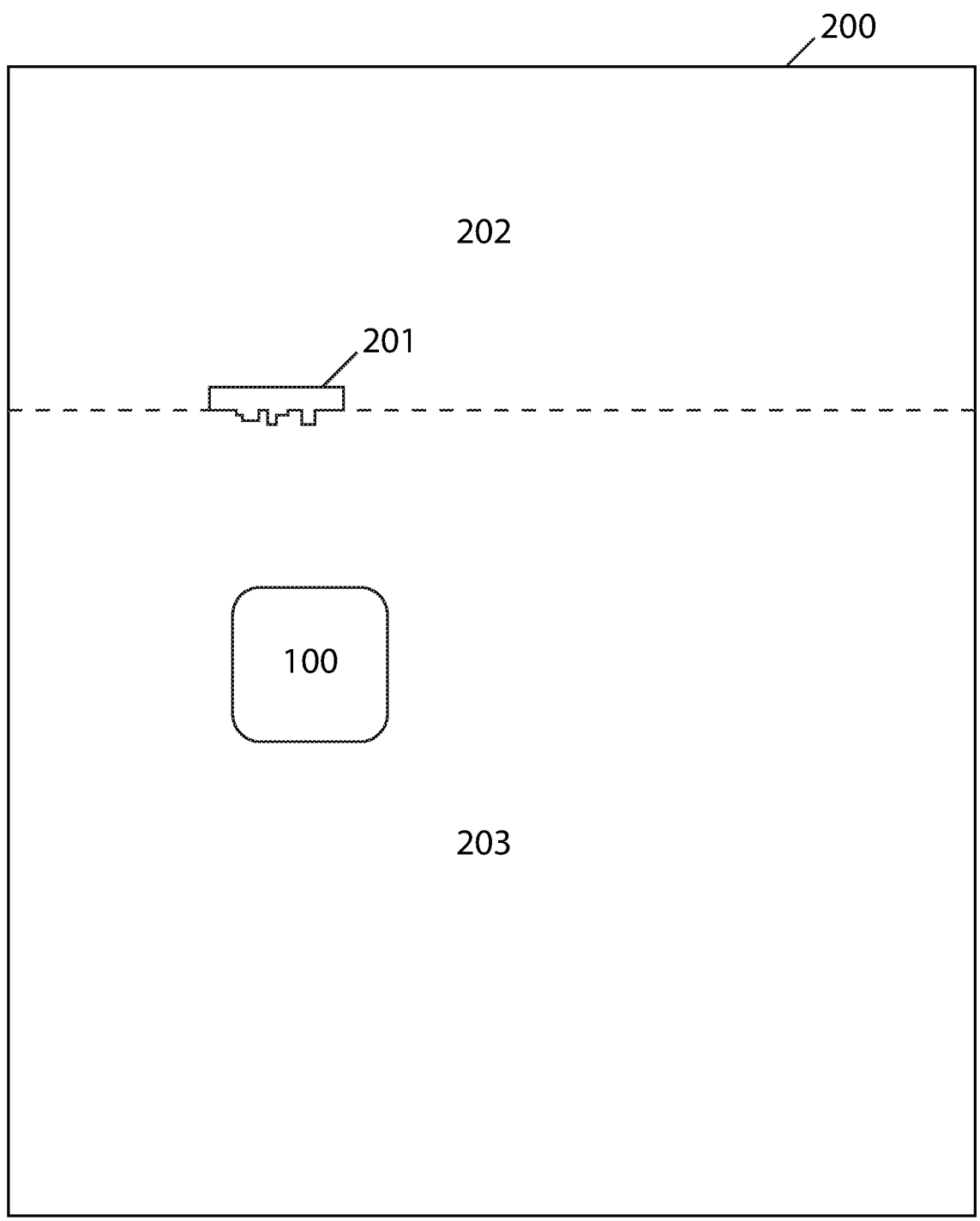
FIG. 2 illustrates a top view of the operation of a confinement system with robotic device and an example of a boundary component embodying features of the present invention.

Referring to FIG. 2, a top view of the operation of the confinement system is illustrated. A boundary component 201 and robotic device 100 are co-located within work area 200. The surface of boundary component 201 has a specific indentation pattern. The indentation pattern in the boundary component shown is an example however. The indentation pattern can be in various configurations. The particular image produced by a line laser projected onto the surface of boundary component 201 shall be pre-programmed in a memory unit of the robotic device. The image processor iteratively compares received images against the pre-programmed surface indentation pattern of the boundary component. A margin of error may be defined to allow for a small amount of miscalculation or distortion.

In the preferred embodiment, once the predetermined indentation pattern is detected the robotic device is configured to mark the location within the working map of the environment and draw a virtual boundary along the plane of the indentation pattern. Referring to FIG. 2, this would have the effect of dividing work area 200 into two zones: workspace 203 and off-limit zone 202 established by boundary component 201. It should be noted that the robotic device may be configured to take any variety of actions as a result of identifying the indentation pattern without limitation. For example, a robotic device may be configured to execute a first set of operations on a first side of a boundary component and a second set of operations on a second side of the boundary component. Or a robotic device may be configured to confine itself to one side of the boundary component for a predetermined amount of time. Or a robotic device may be configured to avoid crossing the virtual boundary. Or a robotic device may be configured to stay on a first and/or a second side of the virtual boundary. Or a robotic device may be configured to perform a deep cleaning of the area inside the virtual boundary.

Figure 3A:
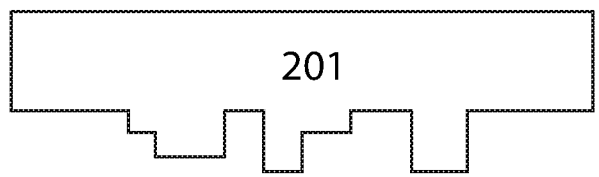
FIG. 3A illustrates a top view of an example boundary component embodying features of the present invention.
Figure 3B:
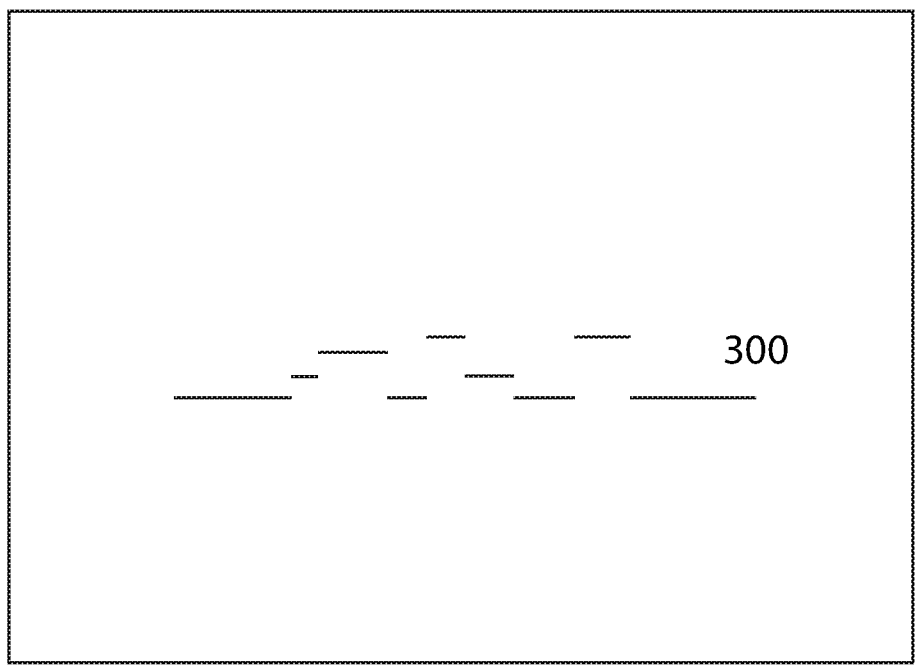
FIG. 3B illustrates a front view of an image captured of the line laser projected onto the surface of the example boundary component in FIG. 3A embodying features of the present invention.

Referring to FIG. 3A, a top view of boundary component 201 is illustrated. Referring to FIG. 3B, a front view of the image captured of the line laser projected onto the surface of boundary component 201 is illustrated. The resulting indentation pattern produced is disjointed line 300 wherein different portions of the line appear staggered. Lines positioned lower correspond with areas of the indentation pattern which are further in distance from the image sensor while lines positioned higher correspond with areas of the indentation pattern which are closer in distance. The indentation pattern and thus corresponding disjointed lines are an example and are not limited to what is shown.

Figure 4:
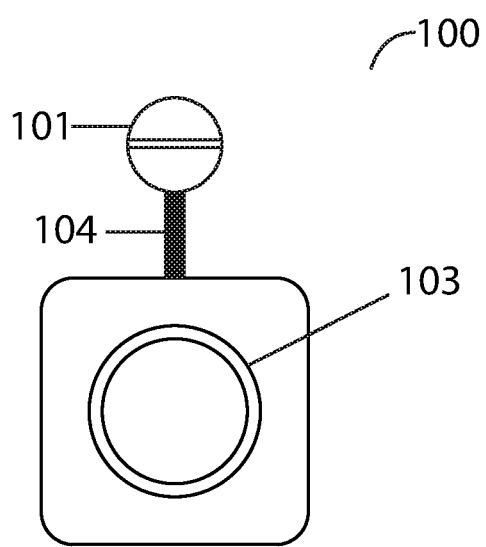
FIG. 4 illustrates a front view of a robotic device embodying features of the present invention.

Referring to FIG. 4, a front view of robotic device 100 is illustrated. Robotic device 100 includes image sensor 103 and line laser diode 101 attached by connecting member 104.

The foregoing descriptions of specific embodiments of the invention have been presented for purposes of illustration and description. They are not intended to be exhaustive or to limit the invention to the precise forms disclosed.

I claim:

1. A method of confining a movement of a robotic device comprising:
   emitting, with a laser diode, a line laser on surfaces of objects within an area,
   capturing, with an image sensor, images of a projection of said line laser on said surfaces of objects as the robotic device moves within said area,
   identifying, with a processor, one or more boundary components based on said captured images of said projection of said line laser,
   generating, with said processor, one or more virtual boundaries based on a location of said one or more identified boundary components, and
   instructing, with said processor, said robotic device to execute one or more actions based on a location of said one or more virtual boundaries.

2. The method of claim 1, wherein said one or more boundary components include at least one indentation.

3. The method of claim 1, wherein said laser diode is positioned at an angle with respect to a plane of a work surface of said robotic device.

4. The method of claim 1, further comprising dividing, with said processor, said area into two or more zones.

5. The method of claim 4, wherein said image sensor is positioned such that the field of view includes the projection of said line laser within a predetermined range of distances.

6. The method of claim 1, further comprising comparing, with said processor, said captured images with one or more images in a memory of said robotic device.

7. The method of claim 6, wherein said one or more images in said memory include at least one image of an indentation pattern formed by a projection of said line laser on said one or more boundary components, said one or more boundary components including at least one indentation.

8. The method of claim 7, wherein said indentation pattern includes a disjointed line.

9. The method of claim 1, wherein said processor identifies said one or more boundary components upon finding a match between said captured images and said at least one image of said indentation pattern.

10. The method of claim 1, further comprising locating and marking, with said processor, said one or more boundary components in a virtual map of said area.

11. The method of claim 1, further comprising determining, with said processor, a distance from said image sensor to a surface of an object based on a position of said line laser in a captured image of said line laser projected on the surface of the object.

12. The method of claim 1, wherein said one or more actions comprise altering movement of said robotic device to avoid crossing said one or more virtual boundaries.

13. The method of claim 1, wherein executing said one or more actions comprises executing a first set of actions on a first side of said one or more virtual boundaries and executing a second set of actions on a second side of said one or more virtual boundaries.

14. The method of claim 1, wherein executing said one or more actions comprises altering movement of said robotic device to stay on a first or a second side of said one or more virtual boundaries.

15. The method of claim 1, wherein executing said one or more actions comprises performing a deep cleaning of an area inside said one or more virtual boundaries.

16. The method of claim 1, wherein a user places said one or more boundary components in the area.

17. A method for measuring distance, comprising:
   emitting, with a laser diode, a line laser on surfaces of objects within an area,
   capturing, with an image sensor, images of a projection of said line laser on said surfaces of objects within said area, and
   determining, with a processor, a distance from said image sensor to said surfaces of objects based on a position of said line laser in said captured images of said line laser projected on said surfaces of objects.

18. The method of claim 17, wherein said laser diode is positioned at an angle with respect to a plane of a work surface of said robotic device.

19. The method of claim 17, further comprising determining, with said processor, a distance from said image sensor to said surfaces of objects based on a size of said line laser in said captured images of said line laser projected on said surfaces of objects.

20. The method of claim 17, wherein said image sensor is positioned such that a field of view of said image sensor includes the projection of said line laser within a predetermined range of distances.

\* \* \* \* \*